April 29, 1958  M. D. COMPTON ET AL  2,832,695
DECORATIVE CERAMIC ARTICLE AND METHOD OF
MANUFACTURING THE SAME Filed Sept. 13, 1952  2 Sheets-Sheet 1

MAX D. COMPTON,
HOBERT R. GOODRICH,
RANDALL C. RAGAN,
INVENTORS.

BY

ATTORNEY.

April 29, 1958  M. D. COMPTON ET AL  2,832,695
DECORATIVE CERAMIC ARTICLE AND METHOD OF
MANUFACTURING THE SAME
Filed Sept. 13, 1952  2 Sheets-Sheet 2

MAX D. COMPTON,
HOBERT R. GOODRICH,
RANDALL C. RAGAN,
INVENTORS.

BY

ATTORNEY.

2,832,695

DECORATIVE CERAMIC ARTICLE AND METHOD OF MANUFACTURING THE SAME

Max D. Compton, Hobert R. Goodrich, and Randall C. Ragan, Glendale, Calif., assignors to Gladding, McBean & Co., Los Angeles, Calif., a corporation of California Application September 13, 1952, Serial No. 309,516

19 Claims. (Cl. 117—40)

This invention relates to improvements in methods of obtaining novel decorative effects on articles composed of formed ceramic bodies and to compositions capable of being used in the performance of the method. Very generally stated, the invention relates to methods of treating formed ceramic objects in such manner as to produce glazed surfaces readily distinguishable from those obtained heretofore by the presence of incized decorative areas and an undulatory surface, portions of which are substantially coplanar with the original formed surface of the ceramic article while other portions extend above the original surface.

Heretofore it has been common practice to apply a glaze-forming composition to the surface of a formed ceramic article and to fire the article so as to mature the glaze-forming composition. The article to which the glaze composition was originally applied (in the form of a slurry, paste or powder) may have been in a dry-pressed or lather-hard, unfired condition or in the form of a bisque. Those skilled in the art know how to modify the maturing temperature ranges of a glaze-forming composition and its shrinkage and expansion characteristics so as to make it "fit" the ceramic body and obtain a finished article having a smooth, uniform, matured glaze coating which is free from pin holes, blow holes, or crazing.

Furthermore, the art heretofore has employed a process in which a glaze composition was applied over the entire surface of a formed article and another glaze composition, of a different coloration, was then applied to portions only of the first-applied overall or background glaze composition. These superimposed glazes could then be burned simultaneously to maturity and very attractive effects obtained. This method of decoration has been used extensively in the manufacture of decorative tile, terra cotta and the like. The external surface of articles thus produced was not entirely smooth since those areas to which superimposed glazes had been applied resulted in a thicker glaze coating so that the external surface of the article was slightly irregular, being higher at decorated areas than at others.

The present invention distinguishes from these prior modes of operation, and from the results obtained thereby in that the method of the present invention permits the formation of articles having novel incized effects whereby a textured or nonplanar effect is obtained. The methods of the present invention contemplate the use of fluxed stains. By this term, reference is made to a mixture composed of a flux in major proportion and a minor proportion of pigmenting or coloring metals, oxides or the like. Such fluxed stain may contain additional relatively inert components which modify or control the effect produced by the flux. By the use of these fluxed stains the method of the present invention permits the formation of ceramic articles having a decorative surface portion (of a desired coloration and differing in color, texture, absorption characteristics, etc., from the normal bisque surface of the article) such decorative areas presenting surfaces which are incized or coplanar with the original formed surface of the article. In other words, although normal glaze compositions, after being fired, present a surface which is above the original formed surface of the article, that is not true of the decorative areas hereinabove referred to obtained by the use of the fluxed stains. Moreover, in accordance with one modification of the process herein described, areas adjacent to the decorative areas hereinabove mentioned, may be of a normal glaze composition and thereby present a surface which is embossed or at a higher level than the original formed surface of the article. These glazed embossed surfaces may differ in texture and color from the incized areas. The resulting article has an extremely novel appearance since it may include matte and glossy surfaces at different levels; it may include decoration in one color and background or embossed area of a different color. A textured, nonplanar effect is therefore obtained which creates a three-dimensional effect, an effect of depth, and increases the attractiveness and saleability of the article.

It is believed that the fluxed stains employed in the performance of the methods of this invention exert a wetting effect (at firing temperatures) which permits the stains to penetrate ceramic bodies (even bodies of a semi-vitrified type) and thereby form decorative surfaces which are not embossed and do not extend appreciably above the original formed surface of the article. Moreover, the fluxed stains react with superimposed glaze-forming compositions, appear to form a eutectic, impart a wetting characteristic to the glaze-forming composition, and permit the formation of decorative incized glazed areas which present a surface at a lower level than those areas to which glaze-forming compositions alone have been applied. By the utilization of the modes of operation described in this paragraph, it is possible to obtain very novel and beautiful effects incapable of being obtained in any other manner known to applicants. For example, the decoration may be in the outline or form of a leaf and although the entire surface of the article is covered with what appears to be a continuous, uniform glossy glaze, the leaf itself may be slightly incized and the veins and ribs of the leaf may be incized to a greater extent, thereby imparting a texture which by reflected light is extremely pleasing, advantage being taken of color contrasts (as between the leaf and the background) as well as of variations in depth, thereby creating a three-dimensional effect.

Moreover, an intelligent use of the fluxed stains, coupled with suitably colored and transparent glaze-forming compositions in superimposed relation gives rise to extremely attractive diffusion effects and permits the development of colors other than those normally obtained by the use of the fluxed stains or glaze compositions individually.

It is to be understood that the various effects described in the preceding four paragraphs may be obtained in various combinations upon a single article. Attention is also called to the fact that the methods of the present invention may be used in the so-called one-fire method (wherein the body is matured at the same time that the glaze compositions are matured) or it can be employed in the normal two-fire process (wherein the glaze compositions are applied to a bisque and all glaze compositions and stains thus applied are matured in one additional firing) or the method may be carried out by applying certain glaze compositions or stains to an unfired body or to a bisque, such glazes or stains then fired and subsequently other stains or glaze compositions applied to the article which is then subjected to still further firing.

From the general description given hereinabove, it will be appreciated that an object of the present invention is to disclose and provide novel methods of producing new decorative effects on articles composed of a ceramic body.

Another object of the present invention is to disclose and provide methods of forming incized decorative effects, portions of the surface presented by the finished article being substantially coplanar with the original formed surface of the article (or lying below the plane of the original surface) while other areas present a finished surface lying in a plane above the original surface of the formed article to which such decoration is applied.

Again, an object of the present invention is to disclose a novel method of operation which employs fluxes and fluxed stains capable of exerting a wetting effect upon the ceramic body (and on glaze compositions adjoining such fluxes) whereby novel effects are obtained.

Moreover, an object of the invention is to provide fluxes and glazes which appear to form eutectics which penetrate and react with ceramic bodies high in magnesia and produce novel decorative effects.

These and various other objects, advantages, modes of procedure and modifications thereof will become apparent to those skilled in the art from a contemplation of the examples described in greater detail hereinafter and illustrated in the appended drawings, in which.

Figure 1:
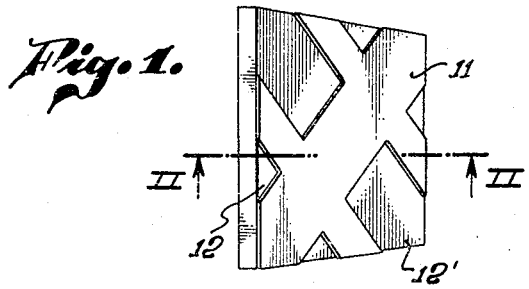
Fig. 1 is a perspective view of a decorative tile provided with a surface made in accordance with the present invention.

Before describing the examples, it is desired to state that although the invention is applicable to many different ceramic bodies, the ceramic bodies best adapted to the performance of the methods of this invention are bodies having a high magnesia content. Exemplary bodies of this type are those having the compositions described in Patents No. 2,025,762, No. 2,072,460, No. 2,073,136, No. 2,159,349 and No. 2,241,705. In addition, compositions having the molecular ratios of say, $1.0Na_2O$ and $K_2O$, $2.0–8.0MgO$, $1.0–3.5Al_2O_3$ to $8–22SiO_2$ can be employed to good advantage. Generally stated, compositions high in magnesia content are those containing from between about 15% and 35% of magnesia. Ceramic articles made of any of these compositions can be burned to maturity under normal firing conditions between about cone 09 and cone 8, and when burned at the higher temperatures, may be termed semi-vitrified. These various bodies may be integrally colored by the addition of pigmenting substances or may be uncolored. The resulting bisque bodies may have an absorption of from about 8% to 18% (percentage of water absorbed by weight of dry bisque). Articles subjected to the methods of this invention may be originally formed by any of the usual methods, as by dry-pressing, casting or jiggering. The term "original formed surface" of the article refers to the surface of the jiggered, cast or dry-pressed object, either before or after bisque firing, but at all events before the application of fluxed stains or glaze-forming compositions thereto.

By the term "fluxed stain" reference is made to a ceramic stain or color (generally a metal or metal oxide such as cobalt, chromium, nickel, iron, manganese, copper, etc.) in minor proportions mixed with a major proportion of a flux having a relatively low fusion or melting point, the fluxes used in the present invention being those which appear to exert a wetting effect upon the body, readily penetrate the body and react with the glaze compositions used on the articles to form what appear to be eutectics which impart wetting characteristics to the glaze compositions in areas where such glaze compositions are in contact with the fluxed stains. Fluxes which have given eminently satisfactory results are lead compounds, particularly lead metasilicate or alamosite ($PbSiO_3$) having a melting point of about 1400° F., lead bisilicate, mixtures of litharge and silica, and lead borosilicate. Small amounts of lead fluorides or lithium fluoride may be present in these fluxed stains. In addition, the fluxed stains may contain up to 30 parts of relatively inert components, such as for example, tin oxide, zirconium oxide or aluminum hydrate to 100 parts of lead silicate, in order to permit control of the reactions in accordance with the porosity of the body and the maturing temperature range of the glaze composition used. A typical fluxed stain may comprise 100 parts lead metasilicate, 2 parts copper oxide and 4 parts tin oxide; another may consist of 85 parts PbO, 15 parts $SiO_2$, 13 parts aluminum hydrate and 4 parts black ceramic stain. In all instances, the lead silicate content is not less than 55% of the total and generally in excess of 65%–75%.

The exemplary tile illustrated in Fig. 1 of the drawings consists of a body portion 10 (originally dry-pressed and fired) having a decorative surface composed of a raised or embossed glaze 11 in the form of diagonal bands and other areas which are coplanar with the original formed surface of the tile body 10 or actually incized thereinto as at 12 and 12'. The transverse section (Fig. 2) clearly illustrates the embossed glaze 11 and the incized areas 12 and 12'. The original formed surface of the tile is indicated at 15 and it will be noted that the glazed areas 11 now present a surface which is above the original formed surface of the article 10. The glaze composition 11 may be of one color, whereas the decorative incized areas 12 may be of an entirely different color. Furthermore, although the glazed areas 11 are elevated and may be glossy, the incized decorative areas 12 may be matte. It will be noted that the fluxed stains which have been applied in the incized areas 12 have penetrated the body 10 to a considerable depth, as indicated by the lower margin 13. The resulting tile therefore presents a nonplanar, textured, undulatory surface, creating a novel and decorative effect.

Figure 2:
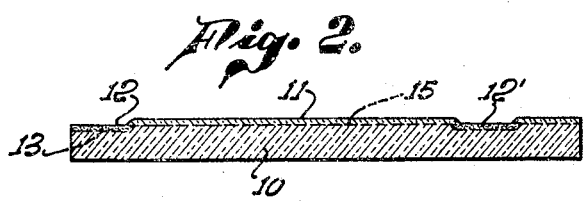
Fig. 2 is an enlarged transverse section taken along the plane II—II of Fig. 1, this figure illustrating the contours of the surface on the finished article.
Figure 3:
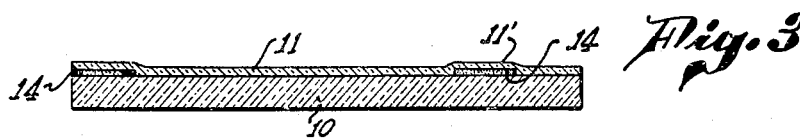
Fig. 3 is an enlarged section illustrating a preliminary step in the formation of the tile upon the Fig. 1.
Figure 4:
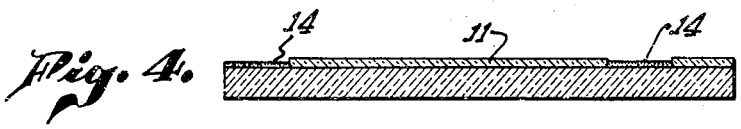
Fig. 4 illustrates a further step in the formation of the decorative surface carried by the tile of Fig. 1.

One method of obtaining the effect illustrated in Figs. 1 and 2 is illustrated in Figs. 3 and 4. It may be assumed that the body of the tile 10 has been made by dry-pressing and has been subjected to a bisque burn prior to the application of the fluxed stains and glaze-forming compositions as hereinafter described. The first step may consist in the step of applying the fluxed stains to the desired portions of the surface, as by application through a silk screen. The fluxed stain so applied to the surface is indicated in Fig. 3 at 14. Thereafter, the entire surface of the article may be coated with a layer of glaze composition 11, as by spraying or by dipping the surface into a slurry of such glaze composition. Initially the glaze-forming composition 11 will therefore cover the fluxed stain, as indicated at 11', but these overlapping portions may be readily removed. In order to facilitate removal of the overlapping portions of the glaze 11', the original fluxed stain 14 (applied only in the selected area) may contain an oleaginous constituent or water-repelling constituent which will preclude adherence of the glaze-forming composition 11 to the fluxed stain 14. Immediately after the application of the glaze-forming composition 11, as illustrated in Fig. 3, the entire tile may be shaken, jolted or vibrated so as to cause the superimposed portion 11' of the glaze to fall off, resulting in a tile 10 provided with a surface coating as illustrated in Fig. 4, wherein the fluxed stains 14 are carried by certain surface areas of the tile and other intervening portions are covered by the glaze-forming composition 11.

The tile in the form illustrated in Fig. 4 is now subjected to firing at a temperature adapted to mature the glaze-forming composition 11. During such firing, the fluxed stain 14 penetrates the body 10 so as to extend thereinto to a considerable depth, as indicated by the lower margin 13. The surface presented in areas to which the fluxed stain has been applied will either be coplanar with the original formed surface 15 of the article or will actually be incized and be below such original formed surface by reason of reaction between the fluxed stain and the body composition. The extent of such reaction will depend somewhat upon the composition used in the body and the flux used in the fluxed stain. The glaze-forming composition 11, however, will simply mature and form an impervious glaze presenting a surface which is above the original formed surface 15 of the body. It is to be understood that the glaze-forming composition 11 is one which has been fitted to the body 10 so as to tenaciously adhere thereto without the formation of crazing or other undesirable imperfections.

Figure 5:
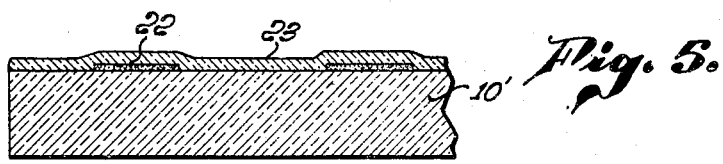
Fig. 5 and Fig. 6 are vertical sections illustrating alternative methods of applying glazes and fluxed stains to the surface of an article.
Figure 6:
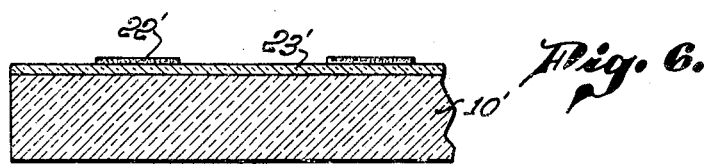
Figure 7:
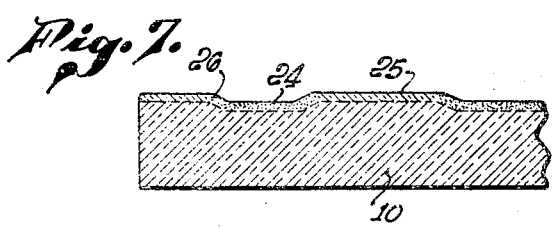
Fig. 7 illustrates the finished result obtained by using the alternative methods of Figs. 5 and 6.

Figs. 5 and 6 illustrate two alternative methods of applying a fluxed stain and a cover glaze, both of these methods producing an effect such as is illustrated in Fig. 7. The surface of the formed object 10' may have the fluxed glaze 22 applied thereto in any desired design, it being understood that the fluxed glaze is applied only to certain areas of the surface of the article. Thereafter, the cover glaze composition 23 is applied to the entire surface of the article 10' including the upper surface of the previously applied fluxed glaze. As previously indicated, the application of the fluxed stain and cover glaze may be made to the formed article 10' when the latter is in a leather-hard condition or in the form of a bisque. The article is then burned or fired on a firing schedule and to a temperature sufficient to mature the cover glaze 23, this temperature being greater than that needed to mature and utilize the fluxed stain decoration. During this burning, the fluxed stain, maturing first, fuses and wets the ceramic body and at the same time attacks and fluxes the still-immature cover glaze 23. The conflation of the fluxed stain and cover glaze permits the resulting products of reaction to permeate and sink into the body 10' to form the depressed areas indicated at 24 in Fig. 7. The finished object, therefore, illustrated in Fig. 7, will have a smooth, continuous, unbroken, upper surface, provided, however, with depressed areas such as 24 which now bear a color determined somewhat by the color of the oxides used in the fluxed stain. If, for example, the cover glaze 23 was colorless and transparent, the color of the original body will be visible through the cover glaze in areas such as 25, whereas the color used in the fluxed stain will be observed in the depressed areas 24. If, however, the cover glaze composition was tinted, then the color or metallic oxide used in the fluxed stain will change or modify the color of the cover glaze in the depressed areas.

The alternative procedure illustrated in Fig. 6 comprises first applying the cover glaze composition 23' to the surface of the object 10' and then, either before or after such cover glaze 23' has been matured, a design is applied to the surface of the cover glaze, such design being in the form of the fluxed stain 22'. Even though the fluxed stain 22' would, of itself, under the firing conditions to which the object is subjected, result in a matte finish, the finished object obtained by using the procedure illustrated in Fig. 6 will be substantially identical to the product illustrated in Fig. 7 and obtained by the procedure illustrated in Fig. 5. In other words, the entire upper surface of the object will be provided with a continuous, unbroken and glossy finish provided the cover glaze 23' was of a composition which would normally under the firing conditions produce a glossy finish, such upper surface exhibiting depressed areas or designs wherever the fluxed stain was applied.

It may be noted at this time that the incized or depressed portions, such as the portions 24, are not separated from the contiguous, raised areas 25 by an indentation or any other break or departure from a confluent, smooth, upper surface. When the alternative procedure illustrated in Fig. 6 is used the depressed areas do not have their margins as sharply defined as is the case when the procedure illustrated in Fig. 5 is employed, and some diffusion of coloring and a more pronounced blending of colors between the cover glaze and fluxed stain can be noted. When the alternative procedure of Fig. 6 is used the unexpected results are apparently due to the activity of the fluxed stain which reacts with the glaze, reduces the surface tension of the glaze and the mixture penetrates the body to form a depressed area.

The extent or degree of incision obtained may be varied somewhat by controlling the thickness to which the fluxed stain is applied and the fusibility of such fluxed stain (as by the addition of alumina). Ordinarily, the fluxed stains may be applied in thickness ranging from 0.0005 to 0.025 in., the greater thickness producing the greatest effect as far as incision and texture are concerned. The fluxed stains may be either fritted or raw and fritting is desirable in the event the metallic oxide used for color tends to form specks. By reason of the reactive character of the fluxed stain, some diffusion of the color contained in the stain into the contiguous cover glaze and elevated portions may take place, as illustrated in Fig. 7 at 26. The reactivity of the fluxed stain is apparently due to its high lead content. As previously indicated, the fluxed stains are characterized by the presence of PbO and $SiO_2$ in the molecular ratio of not less than 1:1 nor more than about 1.45:1. The lead content may be raised to the higher proportions of the range given by the addition of $PbCO_3$, $Pb(OH)_2$, PbO, $PbO_2$, $Pb_3O_4$, or mixtures thereof.

It may be also noted that in many instances the cover glazes used should also contain lead but, as is customary in normal lead glazes, the proportion of lead is relatively small. Examples of typical matte and clear glazes are:

|  | Matte Ivory | Clear Glaze |
| --- | --- | --- |
| $Na_2O$ and $K_2O$ | 6.9 | 2.7 |
| ZnO | 7.2 | 1.1 |
| PbO | 14.2 | 29.6 |
| CaO | 5.4 | 8.4 |
| $Al_2O_3$ | 5.3 | 6.3 |
| $B_2O_3$ | 7.9 | 9.4 |
| $SiO_2$ | 39.0 | 42.5 |
| $ZrO_2$ | 14.0 |  |
|  | 99.9 | 100.00 |
| Iron Stain | 0.72 |  |

Figure 8:
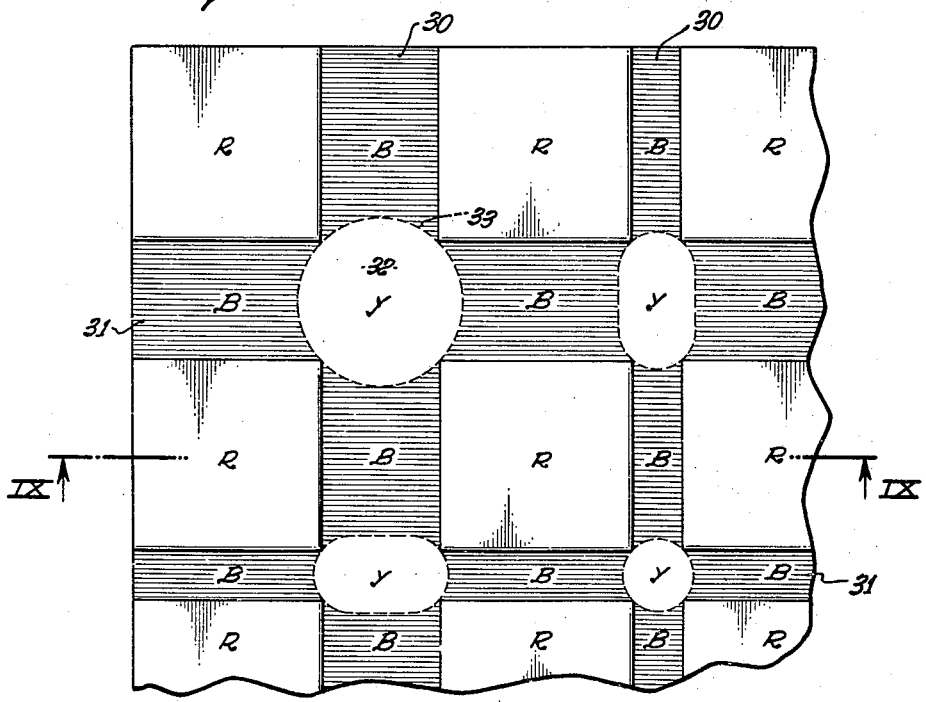
Fig. 8 is a plan view of a portion of the surface of a tile illustrating the manner in which fluxed stains and glaze compositions may be applied in order to obtain secondary color effects in adidtion to the nonplanar or textured effect.
Figure 9:
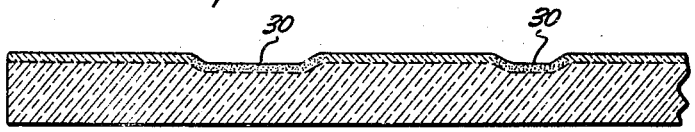
Fig. 9 is a transverse section taken along the plane IX—IX of Fig. 8.

Multi-colored effects including secondary colors developed by reaction between the fluxed stains and glaze compositions may be obtained, the conflation of the fluxed stain and glaze composition producing a color tint differing from colors obtained by the flux and the glaze when applied to separate areas. This unusual effect is illustrated in Figs. 8 and 9, wherein to the surface of a formed ceramic object stripes of fluxed stain are applied, such stripes being indicated at 30. Additional horizontally disposed or intersecting stripes of fluxed stain are applied as at 31. The areas where these two stripes cross are indicated at 32. The entire surface may then be covered with a cover glaze. In the specific example, the cover glaze was a selenium glaze compounded in accordance with the disclosures of Patent No. 2,020,559. The stripes 30 and 31 were, in one example, composed of a fluxed stain containing chromium oxide and tin oxide. Each of the stripes was applied to a thickness of 0.0005 in. Upon being burned to cone 07 (rapid firing schedule), the surface of the tile produced the multi-colored effect indicated by the letters R, B and Y, R identifying red squares, B identifying blue-green areas and Y (at the intersections 32, including the area within the dotted lines 33) exhibiting a chartreuse yellow. Moreover, the surface of the object had attained a textured effect, the fluxed stains producing depressed areas and bands as indicated in Fig. 9.

An even more striking effect can be obtained by having certain of the stripes such as the stripes 30 made of a fluxed stain bearing metallic oxides normally producing one color, whereas the stripes running in the intersecting direction, such as the stripes 31, have been made by the use of a fluxed stain bearing a different metallic oxide or chromophore. A great multitude of unusual effects can thus be obtained.

Those skilled in the art will readily appreciate from the description given hereinabove that the invention is applicable to many ceramic objects and permits the production of numerous unusual and highly desirable effects.

All changes and modifications coming within the scope of the appended claims are embraced thereby.

We claim:

1. A method of producing novel decorative effects on articles composed of a formed ceramic body containing between about 15% and 35% of magnesia and having an absorption of between 3% and 18%, when formed into a bisque which comprises: forming a bisque article from such ceramic body, said article having an original formed surface; applying a fluxed stain to desired portions of such surface, the fluxed stain containing a lead silicate compound adapted to exert a wetting effect upon and penetrate said body at firing temperatures; applying a glaze composition to the surface of the bisque, the glaze composition having a maturing temperature range appreciably above the fusion and reaction point of the fluxed stain; and firing the article to the maturing temperature range of the glaze and above the fusion point of the fluxed stain, whereby the fired article presents a nonplanar finished surface.

2. A method of the character stated in claim 1 wherein the glaze composition is applied to the surface of the bisque in areas other than those to which said fluxed stain is applied.

3. A method of the character stated in claim 1 wherein a coating of the glaze composition is applied to the entire surface of the bisque and the fluxed stain is applied to desired, selected areas of the raw, unburned glaze coating, prior to firing.

4. A method of producing novel decorative effects on articles composed of a formed ceramic body which comprises: forming a bisque article from a ceramic body, said article having an original formed surface; applying a fluxed stain to desired portions of such surface in quantity correlated to the absorption characteristics of the bisque; applying a glaze composition to the surface of the bisque, the glaze composition having a maturing temperature range appreciably above the fusion point of the fluxed stain; and firing the article to within the maturing temperature range of the glaze composition and above the fusion point of the fluxed stain.

5. A method of the character stated in claim 4 wherein the glaze composition is applied to the surface of the bisque in areas other than those to which said fluxed stain is applied.

6. A method of the character stated in claim 4 wherein a coating of the glaze composition is applied to the entire surface of the bisque and the fluxed stain is applied to desired, selected areas of the raw, unburned glaze coating, prior to firing.

7. A method of the character stated in claim 4 wherein the glaze composition is applied to the surface of the bisque and fired to within the maturing temperature range of said glaze composition before the fluxed stain is applied to desired and selected areas, and then firing the article to above the fusion point of said stain and within the maturing temperature range of the glaze composition.

8. A method of the character stated in claim 4 wherein the fluxed stain comprises lead silicate in major proportion and a minor proportion of metallic oxides and pigmenting materials.

9. A method of the character stated in claim 4 wherein the fluxed stain and glaze composition react during firing.

10. A method of the character stated in claim 4 wherein the fluxed stain is applied to selected areas of the bisque in combination with a water-repellant, vaporizable agent; a coating of glaze composition in the form of a slip is applied to the surface of the bisque and over the fluxed stain thereon, whereby the glaze composition does not adhere to those areas of the bisque to which the fluxed stain has been applied.

11. A novel ceramic article having a body burned to maturity at between cone 09 and cone 8, the original formed surface of the body being provided with incized, decorative areas wherein fluxed stain has penetrated into the ceramic body and below the level of the original, formed surface of the body to materially reduce the porosity of the body in such areas and other areas provided with an impervious, glassy glaze carried by and extending above the level of the original formed surface of the ceramic body.

12. A novel article composed of a ceramic body of the unvitrified type, containing between about 15% and 35% of magnesia and having an absorption of between about 8% and 18%, the original formed surface of said body being provided with incized, predetermined, decorative areas wherein fluxed stain has penetrated into the finely porous ceramic body and below the level of the original formed surface of the body and other areas provided with an impervious, glassy glaze carried by and extending above the level of the original formed surface of the ceramic body, whereby the finished outer surface of the article has a contour determined by the incized areas and different from the contour of the original formed surface of the body.

13. An article of the character stated in claim 12 wherein said glaze, in combination with the stain in the incized areas, imparts a continuous, impervious, outer surface to the article, said outer surface having a contour differing from the contour of the original formed surface of the body.

14. A novel ceramic article having a semi-vitrified, finely porous body whose original formed surface is provided with incized, decorative areas wherein fluxed stain has penetrated into the ceramic body and below the level of the original formed surface of the body to materially reduce the porosity of the body in such areas and provide said areas with the matte surface of distinct coloration and other adjacent areas provided with an impervious, glassy glaze carried by and extending above the level of the original, formed surface of the ceramic body.

15. In a method of the character stated in claim 1, the step of controlling the magnitude of deviation from plane in the finished surface by varying the fusibility of the fluxed stain.

16. A method of the character stated in claim 1 wherein the fluxed stain contains PbO and SiO₂ in the molecular ratio of not less than 1:1 nor more than 1.45:1.

17. A method of the character stated in claim 4 wherein the fluxed stain contains PbO and SiO₂ in the molecular ratio of not less than 1:1 nor more than 1.45:1.

18. A method of producing novel decorative effects on a semi-vitrified ceramic body having a high content of magnesia, said body having an original formed surface, comprising: applying glaze composition to the surface of the body; applying a fluxed stain to desired portions of the applied glaze composition, said fluxed stain being adapted to react with the glaze composition and exert a wetting effect upon and penetrate said body at firing temperatures; said glaze composition having a maturing temperature range appreciably above the fusion point of the fluxed stain; and firing the article to within the maturing temperature of the glaze composition and above the fusion point of the fluxed stain to obtain a non-planar decorative effect.

19. A method as stated in claim 18 wherein the glaze composition is burned to virtual maturity before the fluxed stain is applied.

References Cited in the file of this patent

UNITED STATES PATENTS

| | | |
|---|---|---|
| 361,231 | Nichols | Apr. 12, 1887 |
| 415,485 | Vollrath | Nov. 19, 1889 |
| 628,131 | Thuemler | July 4, 1899 |
| 644,530 | Mercer | Feb. 27, 1900 |
| 1,290,580 | Kohler | Jan. 7, 1919 |
| 1,693,252 | Prouty | Nov. 27, 1928 |
| 1,875,721 | Frost | Sept. 6, 1932 |
| 1,905,565 | Lind | Apr. 25, 1933 |
| 2,174,198 | Schramm | Sept. 26, 1939 |
| 2,197,562 | Reinker | Apr. 6, 1940 |
| 2,216,017 | Matthes | Sept. 24, 1940 |
| 2,327,076 | Stangl | Aug. 17, 1943 |
| 2,431,980 | Armstead | Dec. 2, 1947 |
| 2,587,152 | Harlan et al. | Feb. 26, 1952 |